United States Patent
Deeke et al.

[11] Patent Number: 5,976,203
[45] Date of Patent: Nov. 2, 1999

[54] SYNTHESIS GAS GENERATOR WITH COMBUSTION AND QUENCH CHAMBERS

[75] Inventors: Wolfgang Deeke, Mettmann; Wolfram Gruhlke, Toenis-Vorst; Jürgen Heering, Meerbusch; Klaus Köhnen, Mülheim, all of Germany

[73] Assignee: Metallgesellschaft Aktiengellschaft, Frankfurt am Main, Germany

[21] Appl. No.: 09/056,296

[22] Filed: Apr. 7, 1998

[30] Foreign Application Priority Data

Apr. 8, 1997 [DE] Germany .................. 197 14 376

[51] Int. Cl.⁶ ................ R01J 7/00; C10K 8/00; F28D 21/00
[52] U.S. Cl. .............. 48/62 R; 48/128; 422/207; 422/188; 422/241
[58] Field of Search ............... 48/61, 62 R, 73, 48/76, 69, 128, 62 A; 422/241, 194, 207, 224; 261/115; 110/215; 122/6 R

[56] References Cited

U.S. PATENT DOCUMENTS

| | | | |
|---|---|---|---|
| 4,377,394 | 3/1983 | Muenger et al. | 48/62 R |
| 4,605,423 | 8/1986 | Koog. | |
| 4,768,470 | 9/1988 | Ziegler | 122/7 R |
| 4,848,982 | 7/1989 | Tolle et al. | 48/69 |
| 4,859,213 | 8/1989 | Segerstrom | 48/87 |

FOREIGN PATENT DOCUMENTS

| | | |
|---|---|---|
| 0 099 833 B1 | 2/1984 | European Pat. Off. . |
| 0 284 762 A2 | 10/1988 | European Pat. Off. . |
| 0 377 930 A1 | 7/1990 | European Pat. Off. . |
| 26 50 512 A1 | 5/1978 | Germany . |
| 150 313 | 8/1981 | Germany . |
| 40 01 739 A1 | 10/1990 | Germany . |
| 41 09 231 C2 | 9/1992 | Germany . |
| 42 30 124 A1 | 3/1994 | Germany . |
| 195 33 908 A1 | 3/1997 | Germany . |

Primary Examiner—Robert J. Warden, Sr.
Assistant Examiner—James Kennedy
Attorney, Agent, or Firm—McGlew and Tuttle, P.C.

[57] ABSTRACT

A synthesis gas generator with a combustion chamber and quench chamber for generating, cooling and cleaning gases, which are generated by partial oxidation in the combustion chamber of the synthesis gas generator. The combustion chamber (3) and the quench chamber (7) are separate chambers connected by a flow channel (6). Nozzle assemblies (10, 11) with nozzle heads (9, 34), which spray in a quenching medium (8), are arranged in the gas inlet area of the quench chamber (7). The quench zone within the quench chamber (7) is joined by a useful gas-quenching medium-mixing zone. A cone (20) is located at the outlet of the quench chamber. This cone is followed by a water bath (21). The useful gas leaves the synthesis gas generator after deflection by 180° in the rear-side area of the cone (20) via gas outlet openings (23).

17 Claims, 4 Drawing Sheets ized jacket
SYNTHESIS GAS GENERATOR WITH COMBUSTION AND QUENCH CHAMBERS

FIELD OF THE INVENTION

The present invention pertains to a synthesis gas generator with combustion and quench chambers for generating, cooling and cleaning gases, which are generated by partial oxidation in the combustion chamber of a synthesis gas generator.

BACKGROUND OF THE INVENTION

Such synthesis gas generators have been known in various design embodiments. The partial oxidation of fuels, e.g., coal, oil, sewage sludge, plastic wastes, natural gas, etc., with the aim of generating synthesis gas and utilizing it offers wide possibilities of application.

Some of the possible applications are:
Generation of synthesis gas for gas and steam plants, generation of city gas,
supplying chemical plants with synthesis gases,
disposal of wastes (sewage sludge, plastics, residual distillates) with the generation of a high-value product gas ($H_2$ and CO), and
generation of $H_2$ for reduction in steel-making.

Depending on the needs of the application, a waste heat utilization system or a quenching means is arranged downstream of the gas generated by partial oxidation. A quenching medium, e.g., water, is fed into the gas in the quenching means to cool it.

SUMMARY AND OBJECTS OF THE INVENTION

The object of the present invention is to provide an especially advantageous device, in which useful gas is generated, cooled and cleaned by removing coarse, solid and liquid particles.

According to the invention, a synthesis gas generator is provided with combustion and quench chambers for generating, cooling and cleaning gases, which are generated by partial oxidation in the combustion chamber of a synthesis gas generator. The generator includes a combustion chamber and a quench chamber separate from the combustion chamber. A connection channel is provided whereby the combustion chamber is connected to the quench chamber by the connection channel, a useful (product) gas stream flowing through the connection channel into the quench chamber. Nozzle assemblies are provided including quench nozzles which spray a quenching medium in a finely distributed form into the useful gas stream arranged in a gas inlet area of the quench chamber. A useful gas-quenching medium mixing zone is provided joining a quench zone within the quench chamber. A cone is arranged at an outlet of the quench chamber. A water bath region is provided with a gas space and a water space. Outlet pipes are provided extending into the generator. The cone extends into the water bath chamber gas space, forming a useful gas path whereby useful gas leaves the synthesis gas generator with the combustion chamber and the quench chamber, via the gas outlet pipes, after a 180° deflection around a rear-side area of the cone.

According to the present invention, fuel and oxygen are introduced into the combustion chamber via burners, and a useful gas is generated by partial oxidation, and the useful gas is fed into the quenching zone of a quench chamber via a connection channel. The useful gas is cooled at the inlet of the quench chamber by a nozzle system, which is arranged uniformly on the circumference, via which a quenching medium is sprayed in. Depending on the needs, one or more nozzle levels with nozzle assemblies may be arranged.

The temperature of the useful gas is lowered by means of the quenching medium sprayed in. After the quenching, the useful gas leaves the quench chamber via a cone at a high velocity, meets a water bath, and is then deflected by 180° and is sent to the gas outlet pipes.

Due to the high velocity and the great deflection after the cone, larger solid particles and drops of water are separated into the water bath. Thus, the gas leaves the synthesis gas generator cleaned and free from droplets.

The quench chamber may have uncooled or cooled chamber walls. The uncooled walls are lined with ceramic material, and the cooled walls consist of a water-cooled tube-web-tube wall. In another embodiment of the present invention, the cone of the quench chamber is a cooled double-walled construction, wherein an inside of the cone is lined with ceramic.

The synthesis gas generator with combustion and quench chambers may be arranged as one unit in a common pressure vessel. In one alternative, the combustion and quench chambers are designed as separate units and are connected to an overall unit by means of a flange connection.

The gas is generated by means of burners in the combustion chamber. The cooling is ensured by a quenching medium, which is introduced into the quench chamber in a finely distributed form via the quenching nozzles of the nozzle assemblies. The solids and liquid drops are removed due to the high velocity of the gas in the outlet cone, the impact on the water bath, and the subsequent deflection by 180° in the direction of the gas outlet openings.

Exemplary embodiments of the present invention will be explained in greater detail on the basis of schematic drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
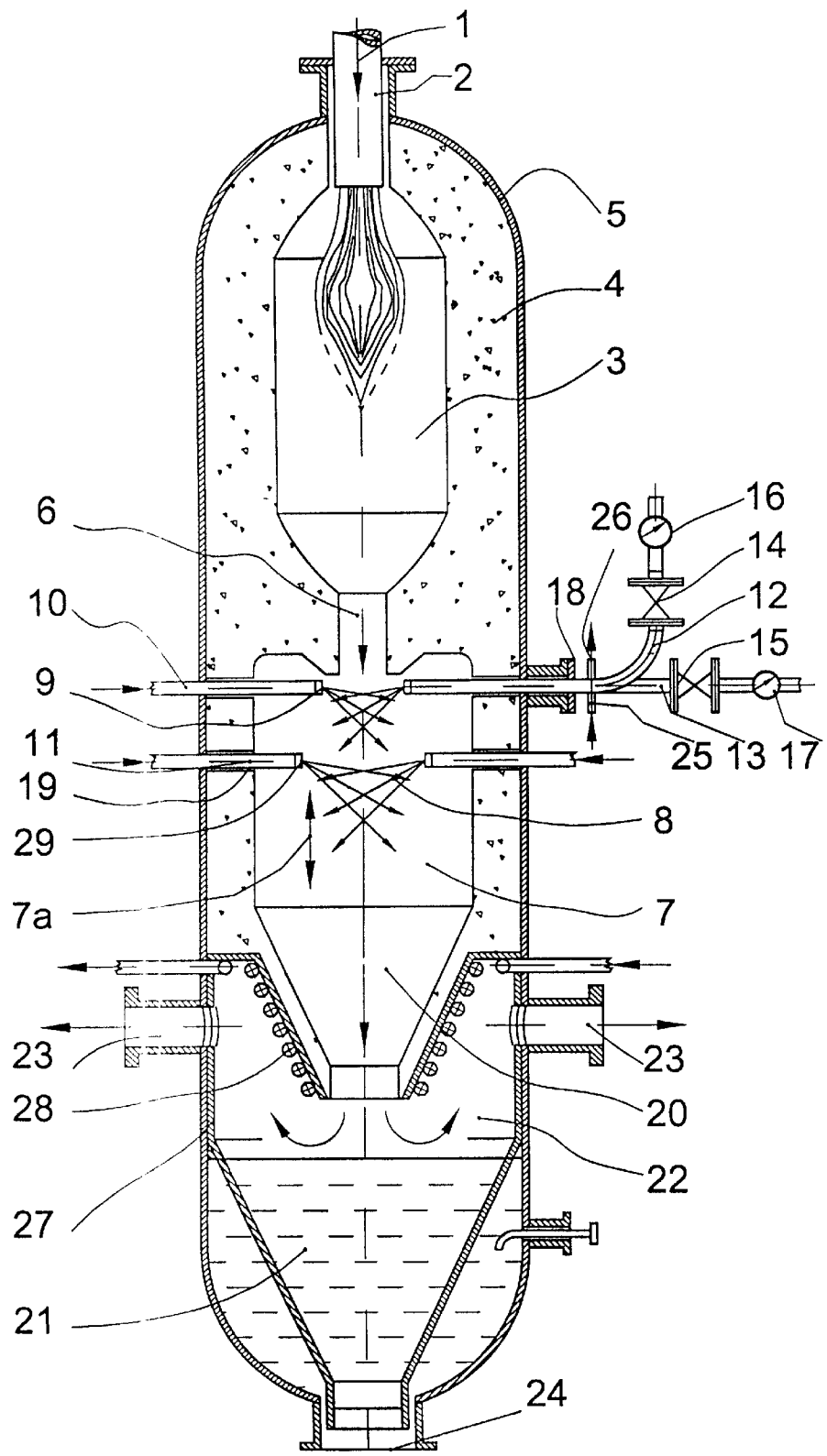
FIG. 1 is a longitudinal sectional view through the synthesis gas generator with integrated quenching means.

As is shown in FIG. 1, fuel 1 enters a combustion chamber 3 via a burner 2. The fuel is gasified here, i.e., useful gas is generated. The combustion chamber 3 is lined with a ceramic material 4 in order to protect the pressurized jacket wall 5 of the combustion chamber 3 from excessively high temperatures. Based on the poor thermal conductivity of the ceramic material, nearly adiabatic gasification takes place. This has a favorable effect on the efficiency of the gasification.

The useful gas and the molten slag leave the combustion chamber, flowing from top to bottom, and enter the quench chamber 7 at a high velocity via the connection channel (jet forming means) 6. The cooling by a cooling medium 8, preferably water, which is introduced into the useful gas via the nozzle heads 9, 29 of the nozzle assemblies 10, 11, takes place in the quench chamber 7.

Depending on the needs, the nozzle assemblies 10, 11 may be arranged at different levels. The nozzle assemblies are equipped with both a coolant connection 12 and a cold gas connection 13 (for, e.g., nitrogen). Both connections have shutoff fittings 14, 15 and flowmeters 16, 17 to ensure the uniform admission of the cooling medium into the quench chamber. If water is used as the cooling medium, nitrogen is used as a flushing and inertizing medium.

The nozzle assemblies 10, 11 are flanged to the pressurized jacket pipes 18, pass through the ceramic lining, and are installed in the cooling position in the quenching space of the quench chamber 7.

Due to the arrangement of suitable passages 19 in the ceramic lining, it is possible to pull nozzle assemblies 10, 11 out of the quench space from the outside in the case of damage or for inspection.

This possibility of access eliminates the need for the time-consuming cooling of the synthesis gas generator and the expensive inspection or repair from the inside.

The cone 20 of the quench chamber 7 has a basic steel body, which is surrounded by a cooling coil 28 to which coolant is admitted. The dimensional stability of the cone 20 in relation to the hot chamber is guaranteed as a result, and it is, in addition, ensured that the ceramic lining of the basic conical steel body will not be damaged.

The cooling of the cone 20 by means of a cooling coil 28 is dispensable if a double-walled cone (not shown) with inner cooling (coolant flow channels in the double walled cone) is used.

The useful gas cooled in the quench chamber 7 leaves the quench chamber 7 via the tapering cone 20. The useful gas carries solid particles and coolant drops, i.e., water drops, and is greatly accelerated in the cone 20 and is directed frontally to a water bath 21. Based on the high velocity and the relatively large mass of the solid and liquid coolant particles, they are unable to be deflected by 180° to the gas outlet pipes 23, but they impact on the surface of the water bath 21, are taken up by the water bath, and are thus separated from the gas flow. The gas cleaned to remove the solids is deflected by 180° and it leaves the synthesis gas generator via the gas outlet pipes 23 after passing through a calming space 22.

The solid particles, e.g., slag, which have fallen into the water bath, are separated via the solid outlet pipes 24.

The inside of the pressure vessel 5, 31 is protected by a lining 27 against corrosion and excessive temperatures in the area in which it comes into contact with the useful gas.

Figure 2:
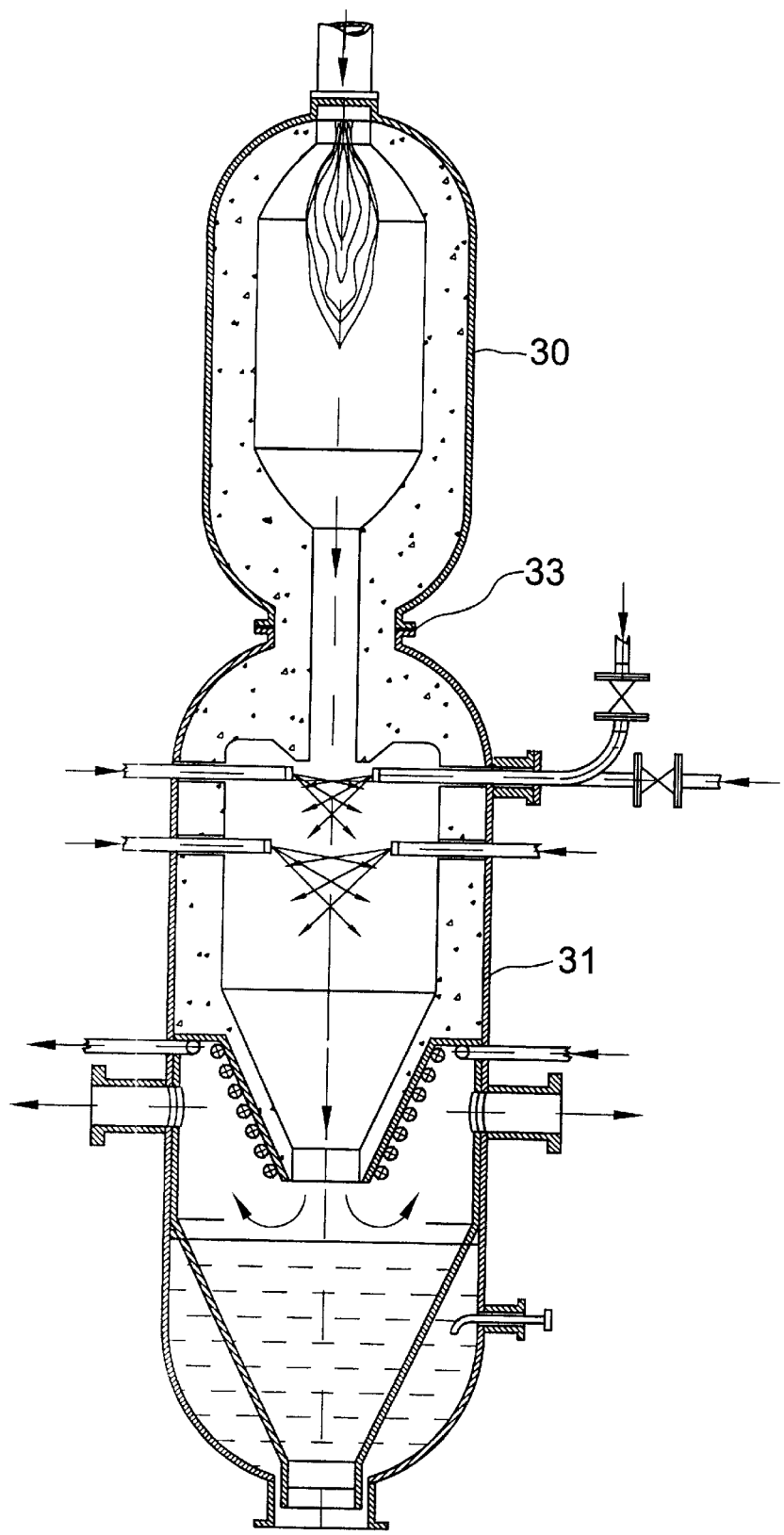
FIG. 2 is a longitudinal sectional view through the synthesis gas generator with separate quenching means.

FIG. 2 shows the synthesis gas generator with separate quench chamber vessel. The basic principles and the mode of operation are the same as those described in FIG. 1. The only difference is that there are two separate pressure vessels 30, 31 for the combustion chamber 3 and the quench chamber 7, and these pressure vessels are connected by means of a flange connection 33 to form one equipment unit.

Figure 3:
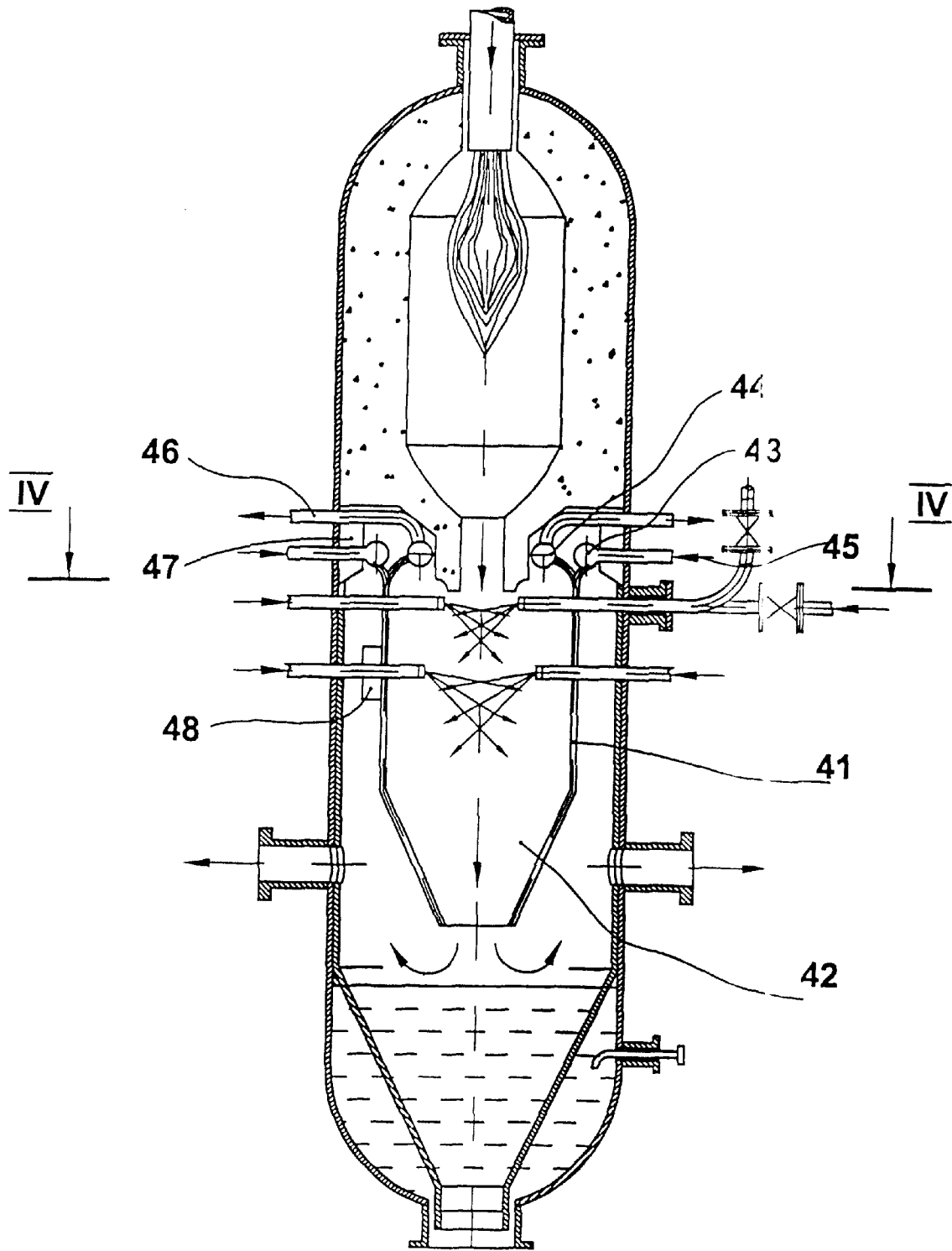
FIG. 3 a longitudinal sectional view through a quenching means with cooling basket.

FIG. 3 shows a longitudinal section through a synthesis gas generator with integrated quenching means. The quench chamber 7 is provided with a cooling system here.

The cooling system comprises a cooling basket 41 with a cone 42, a gas-tight welded construction consisting of cooling tubes and webs, which are provided with a ring distributor 43 and a ring collector 44. Water feed lines 45 and water outlet lines 46, which are passed through the pressure vessel, are arranged at the ring distributor 43 and ring collector 44, respectively. The fixed points 47 of the cooling system are also provided in this area, so that the cooling basket 41 has a possibility of expanding freely in the downward direction.

The nozzle assemblies 10, 11 are passed through the cooling basket 41 as is known from to DE 195 33 908 A1.

Figure 4:
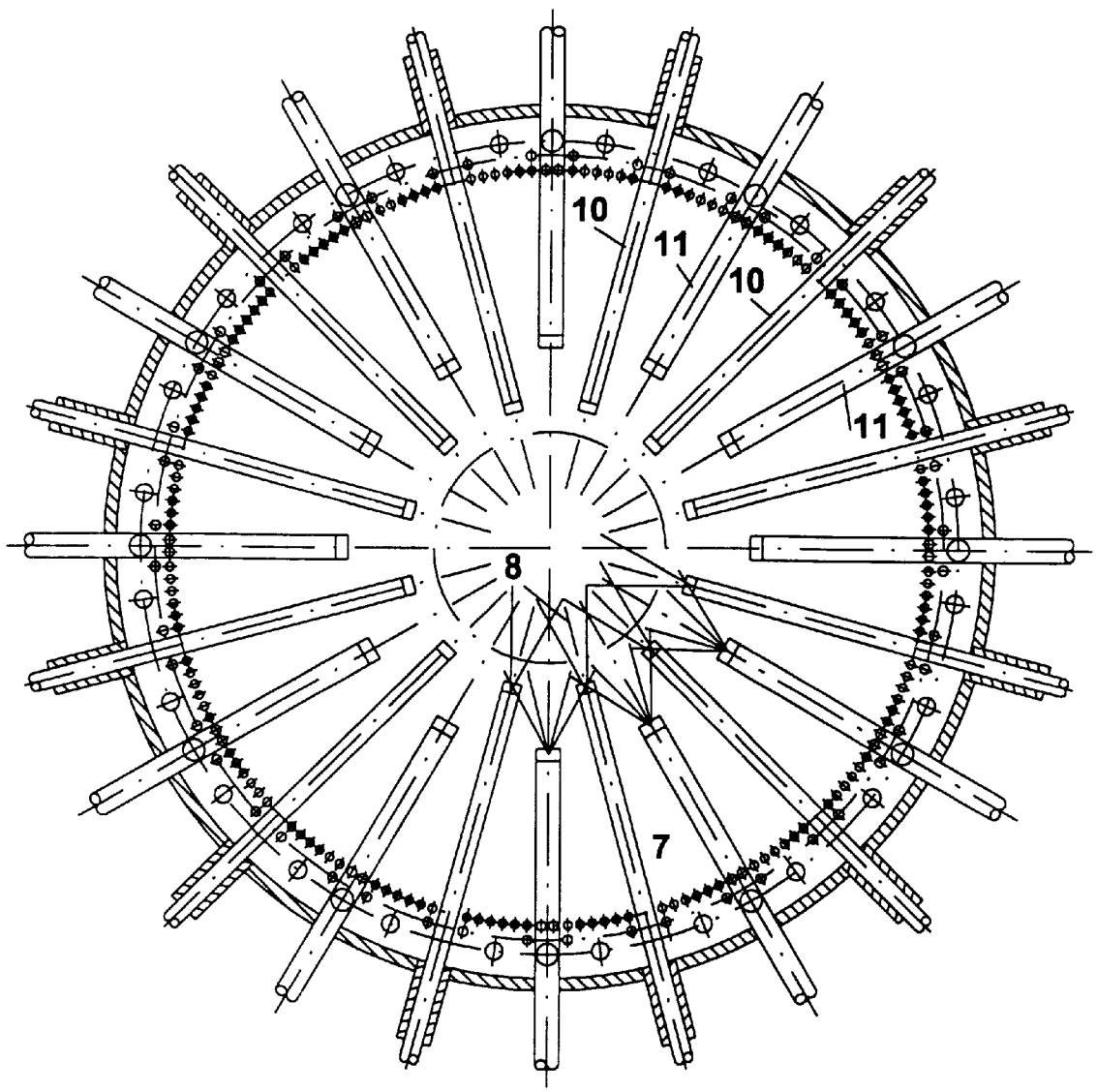
FIG. 4 is a sectional view IV—IV according to FIG. 3 with the arrangement of the nozzle assemblies with nozzles.

FIG. 4 section IV—IV; according to FIG. 3 shows the position of the nozzle assemblies 10, 11 in the quench chamber 7.

While specific embodiments of the invention have been shown and described in detail to illustrate the application of the principles of the invention, it will be understood that the invention may be embodied otherwise without departing from such principles.

What is claimed is:

1. A synthesis gas generator with combustion and quench chambers for generating, cooling and cleaning a gas mixture, which are generated by partial oxidation of a fuel in the combustion chamber of the synthesis gas generator, the gas mixture including $H_2$ and CO, the generator comprising:
   a combustion chamber,
   a quench chamber separate from said combustion chamber and below said combustion chamber;
   a connection channel, said combustion chamber being connected to said quench chamber by said connection channel, a stream of the gas mixture flowing through said connection channel into said quench chamber;
   quench nozzles which spray an aqueous quenching medium in a finely distributed form into the gas mixture, said nozzles are arranged in a gas inlet area of said quench chamber;
   a gas quenching medium mixing zone joining a quench zone within said quench chamber;
   a cone arranged at an outlet of said quench chamber, said cone having a steel body, around which a cooling coil is wound, and said cone is lined with ceramic on an inside,
   said cone has an apex opening and a base opening, said base opening being connected to said gas outlet of said quench chamber;
   a water bath region with a gas space and a water space;
   an outlet pipe, said cone extending into said water bath region gas space, forming a gas path communicating with said outlet pipe whereby the gas mixture leaves the synthesis gas generator through said cone via said gas outlet pipe, after a 180° deflection around an outside of said cone.

2. The synthesis gas generator with combustion and quench chambers in accordance with claim 1, wherein:
   said nozzles are arranged at an inlet of said quench chamber at different levels, and said nozzles at the different levels are in either offset or opposing relation to one other circumferentially.

3. The synthesis gas generator with combustion and quench chambers in accordance with claim 1, wherein said nozzles extend over different distances into said quench chamber.

4. The synthesis gas generator with combustion and quench chambers in accordance with claim 1, wherein said nozzles are provided with interchangeable nozzle heads.

5. The synthesis gas generator with combustion and quench chambers in accordance with claim 1, wherein said combustion chamber and said quench chamber are lined with ceramic material on an inside.

6. The synthesis gas generator with combustion and quench chambers in accordance with claim 1, wherein said combustion chamber is lined on an inside with ceramic material and said quench chamber is a cooling basket formed of cooling conduits.

7. The synthesis gas generator with combustion and quench chambers in accordance with claim 1, further comprising:

penetration passages in said quench chamber whereby said nozzles are inserted into said quench chamber from outside said penetration passages.

8. The synthesis gas generator with combustion and quench chambers in accordance with claim 6, wherein:

said cooling basket includes a penetration passage and a seal;

a seal is adjacent to said penetration passage of said cooling basket.

9. The synthesis gas generator with combustion and quench chambers in accordance with claim 1, wherein said combustion chamber and said quench chamber are either integrated in a common pressure vessel or are formed as separate units with separate vessels which are assembled into an overall unit by a flange connection.

10. The synthesis gas generator with combustion and quench chambers in accordance with claim 1, wherein: said nozzles are adapted for indirect cooling, said nozzles being fed via inlet and outlet pipes.

11. The synthesis gas generator with combustion and quench chambers in accordance with claim 9, further comprising: a protective lining inside of said pressure vessel and under a side of said quench chamber wherein the gas mixture contacts said pressure vessel and said quench chamber, and wherein said lining protects against corrosion and excessive temperature.

12. The synthesis gas generator with combustion and quench chambers in accordance with claim 1 wherein said nozzles are supplied with water via a coolant connection including a shutoff fitting and a flowmeter, and cold gas via a cold gas connection including a shutoff fitting and a flowmeter.

13. The synthesis gas generator in accordance with claim 1, wherein:

said useful gas path extending from said apex opening to said outlet pipe, said substantially 180 degree deflection being around an edge of said apex opening.

14. A synthesis gas generator comprising:

a combustion chamber generating a gas mixture;

a quench chamber separate from said combustion chamber, said quench chamber including a gas inlet area and a gas outlet;

a connection channel connecting said combustion chamber to said quench chamber, the gas mixture flowing through said connection channel into said quench chamber;

a quench nozzle which sprays a quenching medium in a finely distributed form into the gas mixture, said quench nozzle being arranged in said gas inlet area of said quench chamber;

a gas quenching medium mixing zone joining a quench zone within said quench chamber;

a cone positioned at said outlet of said quench chamber, said cone including cooling passages and a ceramic layer on an inside of said, cone said cone has an apex opening and a base opening, said base opening being connected to said gas outlet of said quench chamber;

a water bath region including a gas space arranged around said cone, said water bath region including a water space;

an outlet pipe in communication with said gas space to form a gas mixture path from said cone to said outlet pipe, said gas mixture path including a substantially 180 degree deflection around said cone.

15. Synthesis gas generator with combustion and quench chambers in accordance with claim 14, wherein said cone of said quench chamber is a cooled double-walled construction, wherein an inside of said cone is lined with ceramic.

16. A synthesis gas generator comprising:

a combustion chamber generating a gas mixture;

a quench chamber separate from said combustion chamber, said quench chamber including a gas inlet area and a gas outlet;

a connection channel connecting said combustion chamber to said quench chamber, the gas mixture flowing through said connection channel into said quench chamber;

a quench nozzle which sprays a quenching medium in a finely distributed form into the gas mixture, said quench nozzle being arranged in said gas inlet area of said quench chamber;

a gas quenching medium mixing zone joining a quench zone within said quench chamber;

a cone positioned at said outlet of said quench chamber, said cone including cooling passages and a ceramic layer on an inside of said cone, said cone has an apex opening and a base opening, said base opening being connected to said gas outlet of said quench chamber;

a pressure vessel defining a gas space arranged around said cone, said pressure vessel also including a water space, an inside of said pressure vessel including a protective lining wherein said lining protects against corrosion and excessive temperature under a side of said quench chamber;

an outlet pipe in communication with said gas space to form a gas mixture path from said cone to said outlet pipe, said gas mixture path including a substantially 180 degree deflection around said cone.

17. The synthesis gas generator in accordance with claim 16, wherein:

said protective lining is arranged on portions of said pressure vessel in contact with said gas mixture.

* * * * *